United States Patent
Wang et al.

(10) Patent No.: US 12,040,934 B1
(45) Date of Patent: Jul. 16, 2024

(54) CONVERSATIONAL ASSISTANT FOR OBTAINING NETWORK INFORMATION

(71) Applicant: Juniper Networks, Inc., Sunnyvale, CA (US)

(72) Inventors: Jisheng Wang, Palo Alto, CA (US); Kush Shah, Santa Clara, CA (US); Robert J. Friday, Los Gatos, CA (US); Huan Thien-Vu, Los Angeles, CA (US); Xiaoying Wu, Sunnyvale, CA (US); Amin Toghi Eshghi, San Carlos, CA (US); Yedunandan Siddalingappa-Vitalapur, Bishan (SG); Jordan Batch, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/647,954

(22) Filed: Jan. 13, 2022

Related U.S. Application Data

(60) Provisional application No. 63/265,664, filed on Dec. 17, 2021.

(51) Int. Cl.
*H04L 41/0631* (2022.01)
*G06F 3/0482* (2013.01)
(Continued)

(52) U.S. Cl.
CPC ........ *H04L 41/0631* (2013.01); *G06F 3/0482* (2013.01); *G06F 3/0484* (2013.01); *H04L 41/22* (2013.01)

(58) Field of Classification Search
None
See application file for complete search history.

(56) References Cited

U.S. PATENT DOCUMENTS

| 5,941,978 A | 8/1999 | Finni et al. |
| 7,715,329 B1 * | 5/2010 | Breslau ............... H04L 43/0817 370/255 |

(Continued)

FOREIGN PATENT DOCUMENTS

| CN | 105359144 A | 2/2016 |
| CN | 106164889 A | 11/2016 |

(Continued)

OTHER PUBLICATIONS

"Mesh test results," Posted by jwnpgh on Apr. 22, 2018, Retrieved from: https://www.reddit.com/r/GoogleWiFi/comments/8e687t/mesh_test_results/, 1 pp.

(Continued)

*Primary Examiner* — Dhairya A Patel
*Assistant Examiner* — Sandarva Khanal
(74) *Attorney, Agent, or Firm* — Shumaker & Sieffert, P.A.

(57) ABSTRACT

This disclosure describes a network management system (NMS) configured to determine a particular network device of a plurality of network devices based on a first user input in a conversational assistant. The one or more processors are further configured to identify a set of actionable insights for the particular network device based on network data received from the plurality of network devices and determine a set of views of a dashboard based at least on the set of actionable insights, wherein each view of the set of views displays a portion of the network data received from the plurality of network devices. The one or more processors are further configured to select a view of the set of views of the dashboard based on a second user input in the conversational assistant and cause the dashboard to display the selected view.

17 Claims, 9 Drawing Sheets

(51) Int. Cl.
*G06F 3/0484* (2022.01)
*H04L 41/22* (2022.01)

(56) References Cited

U.S. PATENT DOCUMENTS

| | | | |
|---|---|---|---|
| 7,733,787 B1* | 6/2010 | Paterson | H04L 41/5003 |
| | | | 370/242 |
| 8,291,324 B2 | 10/2012 | Battat et al. | |
| 8,700,875 B1 | 4/2014 | Barron et al. | |
| 8,773,979 B2* | 7/2014 | Chueh | H04L 43/0811 |
| | | | 370/216 |
| 8,887,286 B2* | 11/2014 | Dupont | G06F 21/50 |
| | | | 726/25 |
| 9,448,992 B2 | 9/2016 | Shmiel et al. | |
| 9,832,082 B2 | 11/2017 | Dade et al. | |
| 10,019,305 B2 | 7/2018 | Aneja et al. | |
| 10,198,511 B1 | 2/2019 | Gupta et al. | |
| 10,381,008 B1 | 8/2019 | Ho et al. | |
| 10,489,463 B2 | 11/2019 | Potharaju et al. | |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi | |
| 11,496,373 B2 | 11/2022 | Wu et al. | |
| 11,563,858 B1* | 1/2023 | Rosen | H04L 67/535 |
| 2003/0110413 A1 | 6/2003 | Bernklau-Halvor | |
| 2004/0018857 A1* | 1/2004 | Asokan | H04M 1/27485 |
| | | | 455/565 |
| 2004/0088701 A1 | 5/2004 | Hatalkar et al. | |
| 2007/0043844 A1 | 2/2007 | Sakai | |
| 2007/0192085 A1 | 8/2007 | Roulland et al. | |
| 2007/0208837 A1 | 9/2007 | Tian et al. | |
| 2008/0095327 A1 | 4/2008 | Wlasiuk | |
| 2008/0294423 A1 | 11/2008 | Castellani et al. | |
| 2010/0125753 A1 | 5/2010 | Gadher | |
| 2010/0153426 A1 | 6/2010 | Kim et al. | |
| 2010/0185669 A1 | 7/2010 | Hall et al. | |
| 2010/0318847 A1 | 12/2010 | Beg et al. | |
| 2011/0112827 A1 | 5/2011 | Kennewick et al. | |
| 2011/0167298 A1* | 7/2011 | Lee | G06F 11/2097 |
| | | | 714/E11.131 |
| 2012/0303790 A1 | 11/2012 | Singh et al. | |
| 2013/0067023 A1 | 3/2013 | Joy et al. | |
| 2013/0198412 A1 | 8/2013 | Saito | |
| 2014/0136013 A1 | 5/2014 | Wolverton et al. | |
| 2015/0063339 A1* | 3/2015 | Han | H04W 76/10 |
| | | | 370/338 |
| 2015/0066479 A1 | 3/2015 | Pasupalak et al. | |
| 2015/0127174 A1* | 5/2015 | Quam | G06Q 10/0639 |
| | | | 700/275 |
| 2015/0215177 A1* | 7/2015 | Pietrowicz | H04L 45/02 |
| | | | 370/230 |
| 2015/0378987 A1* | 12/2015 | Sekar | G06F 16/30 |
| | | | 704/9 |
| 2016/0218911 A1* | 7/2016 | Wessels | H04L 43/045 |
| 2016/0219143 A1* | 7/2016 | Zilles | H04M 3/242 |
| 2016/0269895 A1 | 9/2016 | Soini et al. | |
| 2016/0373306 A1 | 12/2016 | Saha et al. | |
| 2017/0302554 A1* | 10/2017 | Chandrasekaran | H04L 41/142 |
| 2018/0013500 A1 | 1/2018 | Liao et al. | |
| 2018/0032216 A1* | 2/2018 | Naous | G06F 11/323 |
| 2018/0032890 A1 | 2/2018 | Podgorny et al. | |
| 2018/0096683 A1 | 4/2018 | James et al. | |
| 2018/0359651 A1* | 12/2018 | Mota | H04W 24/02 |
| 2018/0365327 A1 | 12/2018 | Li et al. | |
| 2019/0005422 A1 | 1/2019 | Lee | |
| 2019/0228296 A1* | 7/2019 | Gefen | G06N 7/01 |
| 2019/0266253 A1 | 8/2019 | Maiti et al. | |
| 2019/0278689 A1* | 9/2019 | Perea | G06F 11/3466 |
| 2019/0369574 A1* | 12/2019 | Val | G06F 8/65 |
| 2020/0134188 A1 | 4/2020 | Bagheri et al. | |
| 2020/0136924 A1 | 4/2020 | Roy et al. | |
| 2020/0151583 A1 | 5/2020 | Mueller et al. | |
| 2020/0241949 A1* | 7/2020 | Basu | G06F 11/0775 |
| 2020/0304364 A1* | 9/2020 | Tapia | H04W 24/04 |
| 2021/0028998 A1* | 1/2021 | Khetarpal | H04L 41/5096 |
| 2021/0158814 A1 | 5/2021 | Hussain et al. | |
| 2021/0193137 A1* | 6/2021 | Smith | G06F 3/165 |
| 2021/0218594 A1* | 7/2021 | Sundararajan | H04L 63/0272 |
| 2021/0250262 A1* | 8/2021 | Ghouse Mohaddin | |
| | | | H04L 43/08 |
| 2021/0306201 A1 | 9/2021 | Wang et al. | |
| 2022/0121660 A1* | 4/2022 | George | G06F 16/2428 |
| 2022/0208188 A1* | 6/2022 | Yoffe | G06V 30/153 |
| 2022/0337495 A1 | 10/2022 | Safavi | |

FOREIGN PATENT DOCUMENTS

| | | | | |
|---|---|---|---|---|
| CN | 110489653 A | | 11/2019 | |
| EP | 3447662 A1 | | 2/2019 | |
| WO | WO-2014145818 A1 * | | 9/2014 | G06F 11/0709 |
| WO | 2015084759 A1 | | 6/2015 | |
| WO | WO-2020214714 A1 * | | 10/2020 | G06K 9/6257 |

OTHER PUBLICATIONS

Bryant, "What is Google Wifi and How Do I Get Started," Posted on GroovyPost, Retrieved Jan. 26, 2022 from: https://web.archive.org/web/20200930061436/https://www.groovypost.com/howto/what-is-googlewifi- and-how-do-i-get-started/, Aug. 26, 2019, 7 pp.

U.S. Appl. No. 17/158,853, filed Jan. 26, 2021, naming inventors Wu. et al.

U.S. Appl. No. 17/303,222, filed May 24, 2021, naming inventor Safavi.

U.S. Appl. No. 18/050,662, filed Oct. 28, 2022, by Wu et al.

U.S. Appl. No. 18/057,019, filed Nov. 18, 2022, by Wang et al.

Aruba: "Aruba Central User Guide", 1-20 Feb. 1, 2017 (Feb. 1, 2017), pp. 1-190, XP055593282, Retrieved from the Internet:URL:https://community.arubanetworks.com/aruba/attachments/aruba/SoftwareUserReferenceGuides/82/1/aruba%20central%20user%20guide.pdf [retrieved on Jun. 3, 2019].

Xue-Ren et al., "Spatial Data Semantic Search Based on Solr", Geomatics & Spatial Information Technology, vol. 39, No. 2, Information Engineering University, Zhengzhou, China, Feb. 2016, 4 pp.

* cited by examiner

CONVERSATIONAL ASSISTANT FOR OBTAINING NETWORK INFORMATION

This application claims the benefit of U.S. Provisional Patent Application No. 63/265,664, filed 17 Dec. 2021, the entire contents of which is incorporated herein by reference.

TECHNICAL FIELD

The disclosure relates generally to computer networks and, more specifically, to monitoring and control of wireless networks.

BACKGROUND

Commercial premises, such as offices, hospitals, airports, stadiums, or retail outlets, often install complex wireless network systems, including a network of wireless access points (APs), throughout the premises to provide wireless network services to one or more wireless client devices. The wireless client devices (also referred to herein as "client devices" or "wireless devices") include laptop computers, smartphones, tablets, wearable devices, appliances, Internet of Things (IoT) devices, etc. Knowing a location of a wireless client device is useful in a variety of applications. For indoor environments, which are generally not amenable to location determination via GPS, a variety of techniques can be used to determine the location of a wireless device.

SUMMARY

In general, this disclosure describes one or more techniques for a network management system (NMS) to remotely monitor and/or evaluate performance in a wireless network. The wireless network system includes one or more access point (APs), each including one or more wireless transmitters, configured to provide a wireless network at a customer premises or other site. A conversational assistant may be configured to help direct an administrator to relevant network data in a dashboard. The conversational assistant may include a natural language processer to identify an actionable insight based on natural language provided by the administrator and network data received from the APs. For example, an administrator may enter a text string "troubleshoot AP1" using the conversational assistant. In this example, the conversational assistant may identify, with a network connectivity engine, one or more actionable insights (e.g., a slow association or limited capacity of AP1) based on a user input (e.g., a text string "troubleshoot AP1"). The conversational assistant may determine, with a network connectivity engine, network data for a selected view based on the one or more actionable insights and may cause the dashboard to display the view. For instance, the conversational assistant may cause the dashboard to display a view indicating a failure timeline for AP1. While this example was directed to APs, techniques described herein may be directed to other network devices.

The techniques of the disclosure provide one or more technical advantages and practical applications. The techniques enable the NMS to automatically control a user interface to display a dashboard with more relevant network device details compared to systems that rely on only the administrator to control the dashboard. For example, the NMS may quickly identify a view of network device details for display at a dashboard that is directed to an identified actionable insight based on a text string provided by the administrator in a conversational assistant. In this way, the NMS may reduce an amount of time the administer spends to identify relevant information for a network. Moreover, reducing an amount of time the administer spends to identify relevant information for a network may reduce an amount of time that a failure occurs at the network, which may help to improve a reliability of the network. The dashboard is frequently used by administrators and allowing the administrators an easier to use user interface may potentially save the administrator time and/or reduce a complexity of using the conversational assistant.

In one example, the disclosure describes a system comprising: a plurality of access points (APs) configured to provide a wireless network at a site; and a network management system comprising: a memory storing client-side data collected by a plurality of client devices associated with the wireless network and storing location data associated with each of the plurality of client devices generated by a location engine in response to location requests issued by each of the plurality of client devices; and one or more processors coupled to the memory and configured to determine, based on at least one of the client-side data and the location data, one or more location metrics associated with the location requests issued by the plurality of client devices.

In another example, the disclosure describes a method comprising receiving, by one or more processors of a network management system that manages a plurality of access point (AP) devices associated with a wireless network, client-side data collected by a plurality of client devices associated with the wireless network; receiving location data associated with each of the plurality of client devices generated by a location engine in response to location requests issued by each of the plurality of client devices; and determining, by the one or more processors and based on at least one of the client-side data and the location data, one or more location metrics associated with the location requests issued by the plurality of client devices.

In another example, the disclosure is directed to a non-transitory computer-readable storage medium comprising instructions that, when executed, configure processing circuitry to receive client-side data collected by a plurality of client devices associated with a wireless network and receive location data associated with each of the plurality of client devices generated by a location engine in response to location requests issued by each of the plurality of client devices; and determine, based on at least one of the client-side data and the location data, one or more location metrics associated with the location requests issued by the plurality of client devices.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
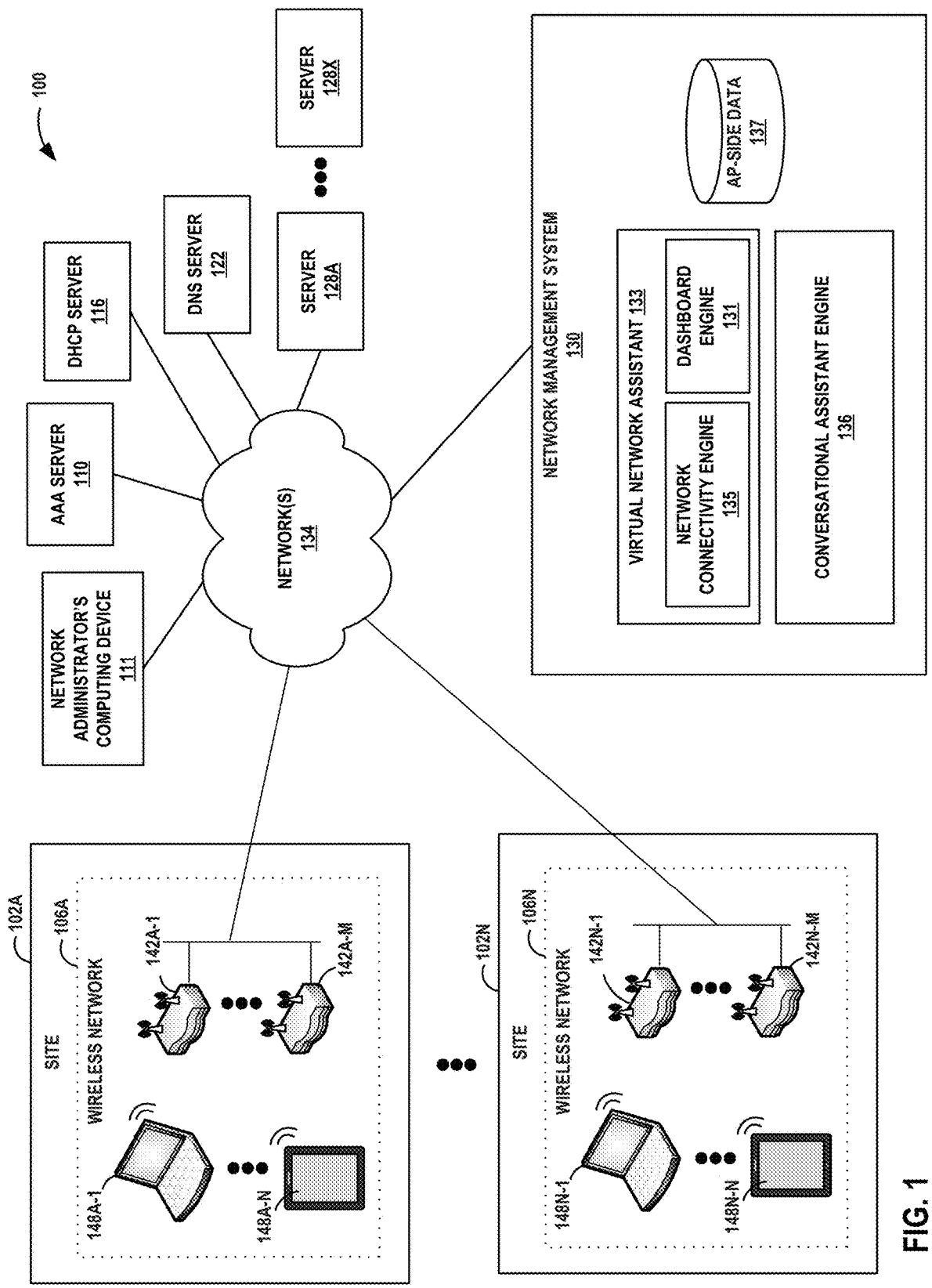
FIG. 1 is a diagram of an example network system in which a network management system directs an administrator to actionable insights, in accordance with one or more techniques of the disclosure.

The problem of troubleshooting and obtaining network information quickly and deterministically to identify root cause and/or answer network questions is an important value proposition for network administrators. In some systems, administrators may control a dashboard to display network device details (e.g., a failure timeline, device details, or a scope of impact) for access points (APs) to identify supporting evidence information (e.g., device connectivity information). For instance, the administrator may identify, using a failure timeline, that a failure has occurred at a particular AP and determine supporting evidence information that the particular AP is slow 100% of the time. Once the administrator identifies the supporting evidence information, the administrator may control the dashboard to identify actionable insights relevant to the supporting evidence information. For instance, the administrator may control the dashboard to display a view for correcting a slow association due to a previous authentication being no longer valid or a view for correcting a limited capacity on a network device.

The proposed solution includes a conversational assistant configured to help direct an administrator to actionable insights without relying on the administrator to identify the actionable insights. For example, the conversational assistant may include a natural language processer to identify an actionable insight based on natural language provided by the administrator and network data received from the APs. For instance, the administrator may enter a text string "troubleshoot AP1." In this example, the conversational assistant may be configured to run a root cause analysis on AP1 using the network data and identify a set of actionable insights that includes correcting a slow association due to a previous authentication being no longer valid and correcting a limited capacity on AP1. In this example, the administrator may select one of the actionable insights provided by the conversational assistant to cause the conversational assistant to display supporting evidence information. For instance, the administrator may select the actionable insight for correcting a slow association due to a previous authentication being no longer valid and the conversational assistant may determine, based on network information for AP1, that AP1 was slow 100% of the time. In this example, the conversational assistant may present an option to select a view of a set of network device details for display at the user interface. For instance, the conversational assistant may provide an option to view a failure timeline, device details for AP1, or a scope of impact. The administrator may indicate a selection of one of the views providing the network device details and the conversational assistant may cause the user interface to display a dashboard with the selected view. The selection of the view may include selecting the view based on a time and/or context (e.g., a geography, a device, or a human user) determined based on user input into the conversational assistant. In this way, the conversational assistant may control the dashboard to display more relevant network device details compared to systems that rely on only the administrator to control the dashboard. While this example was directed to APs, techniques described herein may be directed to other network devices.

FIG. 1 is a diagram of an example network system 100 in which a network management system directs an administrator to actionable insights, in accordance with one or more techniques of the disclosure. Example network system 100, such as a network system for an organization or enterprise, includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Sites 102, such as offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-M. Similarly, site 102N includes a plurality of AP devices 142N-1 through 142N-M. Each AP device 142 may be any type of wireless access point, including, but not limited to, a commercial or enterprise access point, a router, or any other device capable of providing wireless network access. Although the example of FIG. 1 is described with respect to wireless network systems, the techniques described in this disclosure may apply to wired network systems and/or wireless network systems.

Each site 102A-102N also includes a plurality of wireless client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1, the various devices and network system 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to wireless client devices, IoT devices and end users at the site. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, and alert generation.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 137 may be collected and/or measured by other devices in the network system 100. In accordance with one specific implementation, a computing device is part of the network management server 130. In accordance with other implementations, NMS 130 may comprise one or more computing devices, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. Dashboard engine 131 may generate a dashboard that displays a portion of network data received from network devices (e.g., AP devices 142). NMS 130 may include a network performance engine that automatically determines one or more service level experience (SLE) metrics for each client device 148 associated with a wireless network 106. SLE metrics determined based on the collected network data can be used to measure various aspects of wireless network performance. SLE metrics seek to measure and understand network performance from the viewpoint of the end user experience on the network.

One example SLE metric is a coverage metric, which tracks the number of user minutes that a client device's received signal strength indicator (RSSI) as measured by the client and conveyed via an access point with which the UE is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as a received signal strength indicator (RSSI) of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to detect network scope failure and identify the root cause of error conditions detected from the streams of event data. VNA 133 may generate a notification indicative of the root cause and/or one or more remedial actions that may be taken to address the root cause of the error conditions. In some examples, if the root cause may be automatically resolved, VNA 133 invokes one or more remedial or mitigating actions to address the root cause of the error condition, thus automatically improving the underlying wireless network performance, and also automatically improving the user experience of the wireless network.

Computational resources and components implementing VNA 133 may be part of the NMS 130, may execute on other servers or execution environments, or may be distributed to nodes within network 134 (e.g., routers, switches, controllers, gateways and the like). Example details of these and other operations implemented by the VNA 133 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled. "Virtual Network Assistant Having Proactive Analytics and Correlation Engine Using Unsupervised ML Model," all of which are incorporated herein by reference in their entirety.

In some examples, an NMS agent (not shown) runs on UEs 148 and provides telemetry data to NMS 130 from the perspective of UEs 148. The NMS agent allows NMS 130 to receive telemetry data related to the client device experience from the client devices' perspectives, in addition to data already received by NMS 130 from the perspective of an AP through which the client device connects to NMS 130. The NMS agent may also provide device properties of the UE 148 to NMS 130, including operating system (OS) version, modem firmware and software versions, application version running the network agent, and the like. Network connectivity engine 135 of NMS 130 may use artificial intelligence functionality to analyze the received data, identify WiFi connectivity issues, e.g., roaming issues or WiFi vs. cellular, with certain types, versions, or locations of client devices, and generate an action recommending a mitigation action.

In some examples, NMS 130 receives telemetry data from the NMS agent on a particular client device 148, correlates the received telemetry data with a client device identifier, associates the client-side telemetry data with client device location data and other AP-side telemetry data based on the client device identifier, analyzes the client-side telemetry data with respect to the associated AP-side telemetry data to determine one or more location metrics for the wireless network. In this manner, NMS 130 can identify one or more issues or problems with respect to location performance for the wireless network.

Conversational assistant engine 136 may be configured to process user inputs, such as text strings, and generate responses. In some examples, conversational assistant engine 136 may include one or more natural language processors configured to process the user inputs. Conversational assistant engine 136 may be configured to conduct a chat conversation that simulates a way a human would behave as a conversation partner, which may help to simplify and/or improve a satisfaction of an administrator monitoring and controlling a network.

In accordance with one or more techniques of the disclosure, conversational assistant engine 136 may generate a conversational assistant configured to receive a first user input. For instance, the conversational assistant may receive a string indicating a device identifier (e.g., "troubleshoot AP1"). In some instances, the conversational assistant may receive a string indicating a user identifier (e.g., "troubleshoot user1"). The conversational assistant may receive a string indicating a geographical identifier (e.g., "troubleshoot site1").

Conversational assistant engine 136 may determine a particular network device of a plurality of network devices based on a first user input in a conversational assistant. For example, conversational assistant engine 136 may determine a AP device 142A-1 of AP devices 142 based on a first user input (e.g., a device identifier for AP device 142A-1) in conversational assistant engine 136. Network connectivity engine 135 may identify a set of actionable insights for the particular network device based on network data received from the plurality of network devices. Each actionable insight of the set of actionable insights identifies one or more steps for troubleshooting the particular network device. For example, network connectivity engine 135 may identify a set of actionable insights (e.g., correcting a slow association due to a previous authentication being no longer valid or correcting a limited capacity on AP device 142A-A) for AP device 142A-1 based on network data received from AP devices 142. For instance, network connectivity engine 135 may apply a root cause engine to the network data received from AP devices 142.

Network connectivity engine 135 may determine a set of views of a dashboard based at least on the set of actionable insights. Each view of the set of views may display a portion of the network data received from the plurality of network devices. For example, network connectivity engine 135 may determine, for each actionable insight of the set of actionable insights, supporting evidence information for each view. The supporting evidence information may include one or more of a failure timeline for the particular network device, a client insight, or a scope of impact. As an example, network connectivity engine 135 may determine a first view for a failure timeline for AP device 142A-1, determine a second view for a client insight for a user associated with AP device 142A-1, and determine a third view for a scope of impact for AP device 142A-1.

Network connectivity engine 135 may select a view of the set of views of the dashboard based on a second user input in the conversational assistant. For example, network connectivity engine 135 may cause network administrator's computing device 111 to display a user interface outputting the dashboard to indicate each one of the set of views and the user interface determines a user interaction (e.g., using a mouse, using a touch sensitive display, etc.) indicating a selection of one of the views of the set of views.

Network connectivity engine 135 may cause the dashboard to display the selected view using the network data received from the plurality of network devices. For example, network connectivity engine 135 may cause user equipment 148A-1 to display a user interface to indicate the dashboard with the selected view. The selected view may include a portion of the network data received from the plurality of network devices. For example, the selected view may display supporting evidence information for AP device 142A-1.

Figure 2:
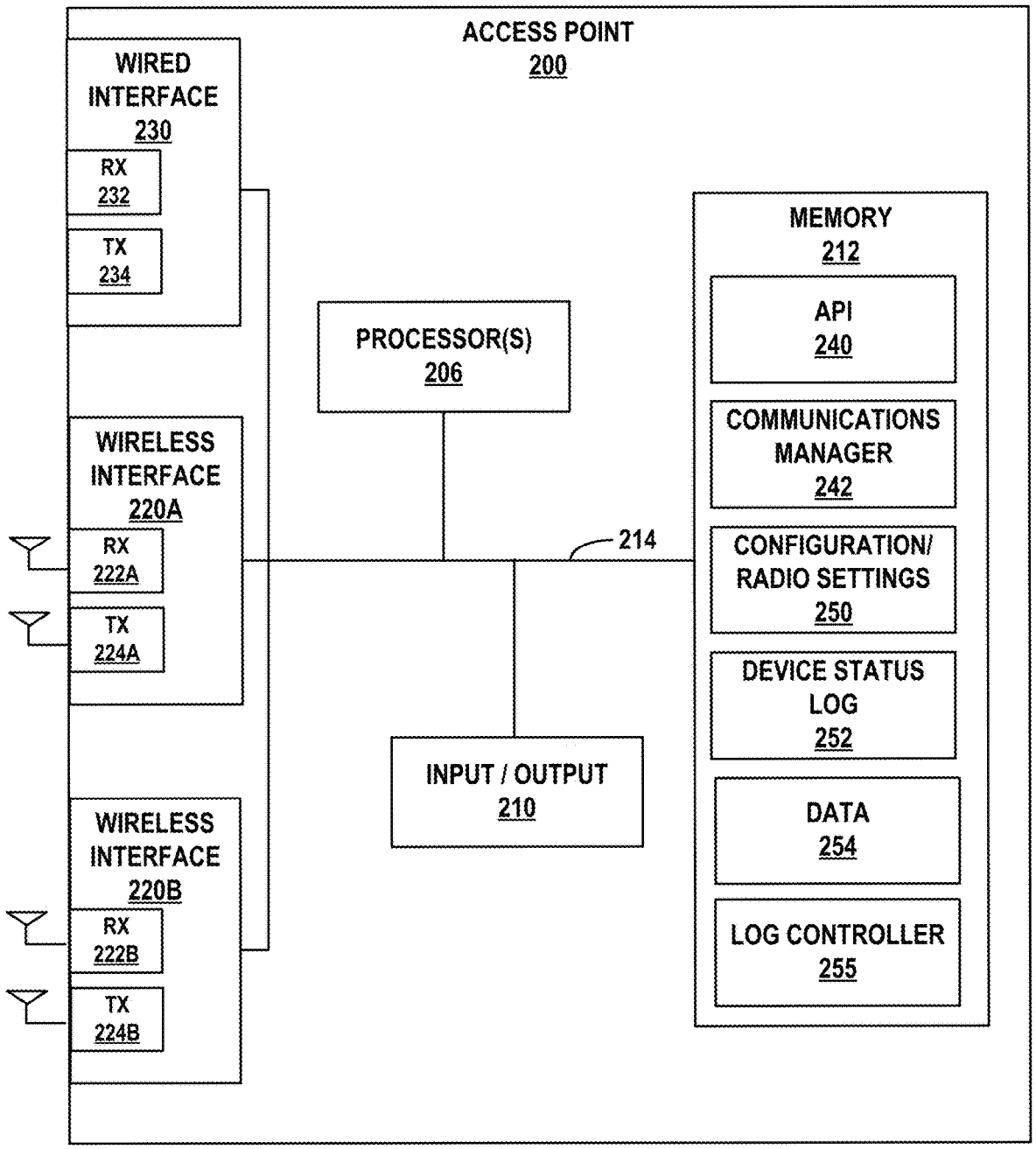
FIG. 2 is a block diagram of an example access point device, in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1. Access point device 200 may comprise, for example, a WiFi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1. First wireless interface 220A and second wireless interface 220E represent wireless network interfaces and include receivers 222A and 222B, respectively, each including a receive antenna via which access point 200 may receive wireless signals from wireless communications devices, such as UEs 148 of FIG. 1. First and second wireless interfaces 220A and 220B further include transmitters 224A and 224B, respectively, each including transmit antennas via which access point 200 may transmit wireless signals to wireless communications devices, such as UEs 148 of FIG. 1. In some examples, first wireless interface 220A may include a WiFi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the UE devices 148 and transmitted to AP device 200, may be measured by AP device 200 itself or by any other device associated with the wireless network and transmitted to AP device 200.

Network data stored in data 254 may include, for example, AP events and/or UE events. In some examples, the network events are classified as positive network events (otherwise referred to herein as "successful network events" or "successful events"), neutral network events, and/or negative network events (otherwise referred to herein as "failure network events" or "failure events"). The network events may include, for example, memory status, reboot events, crash events, Ethernet port status, upgrade failure events, firmware upgrade events, configuration changes, authentication events, DNS events, DHCP events, one or more types of roaming events, one or more types of proximity events, client authentication events (e.g., success and/or failures), etc., as well as a time and date stamp for each event. Log controller 255 determines a logging level for the device based on instructions from NMS 130. Data 254 may store any data used and/or generated by access point device 200, including data collected from UEs 148, such as successful events, failure events, and/or neutral events, that is transmitted by access point device 200 to NMS 130 for cloud-based management of wireless networks 106A by NMS 130.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Figure 3:
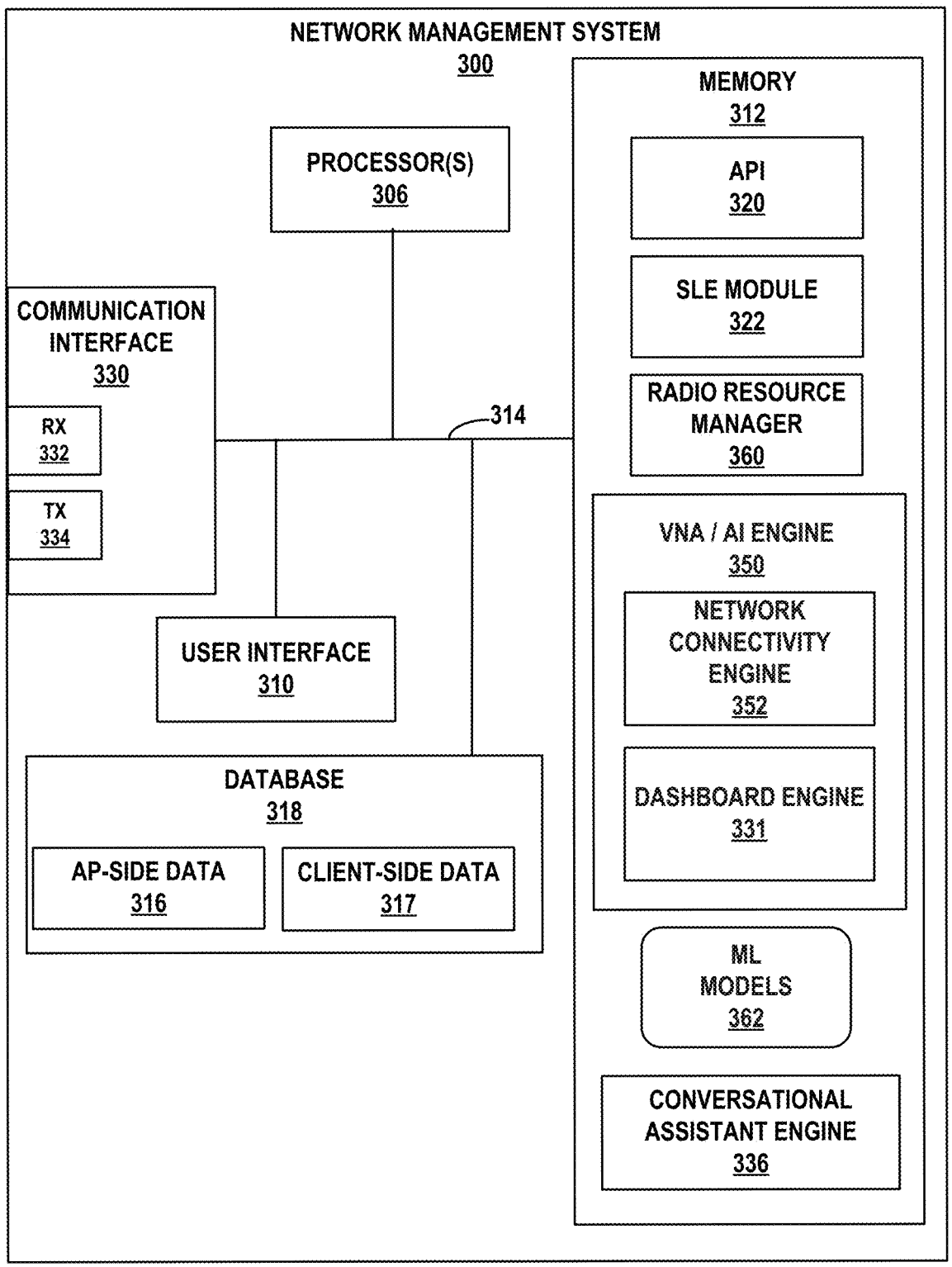
FIG. 3 is a block diagram of an example network management system configured to direct an administrator to actionable insights, in accordance with one or more techniques of the disclosure.

FIG. 3 is a block diagram of an example network management system (NMS) 300 configured to direct an administrator to actionable insights, in accordance with one or more techniques of the disclosure. In the example of FIG. 3, NMS 300 may be used to implement, for example, NMS 130 in FIG. 1. In such examples, NMS 300 may be responsible for monitoring and management of one or more wireless networks 106A-106N at sites 102A-102N, respectively. In some examples, NMS 300 receives network data collected by AP devices 142 and/or from UEs 148, such as network data used to generate one or more events (e.g., successful events and/or failure events), and analyzes this data for cloud-based management of wireless networks 106A-106N. In some examples, NMS 300 may be part of another server shown in FIG. 1 or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1, and/or any local area networks. Communications interface 330 includes a receiver 332 and a transmitter 334 by which NMS 300 receives/transmits data and information to/from any of AP devices 142, UEs 148, servers 110, 116, 122, 128 and/or any other devices or systems forming part of network system 100 such as shown in FIG. 1. The data and information received by NMS 300 may include, for example, network data and/or event log data received from UEs 148 and AP devices 142 used by NMS 300 to remotely monitor and/or control the performance of wireless networks 106A-106N. Database 318 of NMS 300 may store the network data and/or event log data received from UEs 148 and AP devices 142. NMS may further transmit data via communications interface 330 to any of network devices such as AP devices 142 at any of network sites 102A-102N to remotely manage wireless networks 106A-106N.

Network connectivity engine 352 may receive client-side data, including client device properties, from an NMS client agent executing on the client device (UE 148). As one example, network connectivity engine 352 receives a device identifier of the client device from the NMS client agent, such as a universal unique identifier (UUID) of the client device. network connectivity engine 352 can use the device identifier to correlate the client-side data for a particular client device of the plurality of client devices with a device identifier of the particular client device, and associate, based on the device identifier, the client-side data for the particular client device and the AP-side data for the particular client device.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

Memory 312 may include an APT 320, SLE module 322, a radio resource management (RRM) engine 360, a virtual network assistant (VNA)/AI engine 350, a conversational assistant engine 336 and a machine learning model 362. NMS 300 may also include any other programmed modules, software engines and/or interfaces configured for remote monitoring and management of wireless networks 106A-106N, including remote monitoring and management of any of AP devices 142.

RRM engine 360 monitors one or more metrics for each site 106A-106N in order to learn and optimize the radio-frequency (RF) environment at each site. For example, RRM engine 360 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 360 may determine channel and transmit power distribution across all AP devices 142 in each network 106A-106N. RRM engine 360 may monitor events, power, channel, bandwidth, and number of clients connected to each AP device. RRM engine 360 may further automatically change or update configurations of one or more AP devices 142 at a site 106 with an aim to improve the coverage and/or capacity SLE metrics and thus to provide an improved wireless experience for the user.

VNA/AI engine 350 may analyze network data received from AP devices 142 as well as its own data to monitor performance of wireless networks 106A-106N. For example, VNA engine 350 may identify when anomalous or abnormal states are encountered in one of wireless networks 106A-106N. In accordance with the techniques described in this disclosure, dashboard engine 331 may generate a dashboard that displays a portion of network data received from network devices (e.g., AP devices 142). Network connectivity engine 352 may represent an example implementation of network connectivity engine 135 of FIG. 1. In some examples, the network connectivity engine 352 utilizes artificial intelligence-based techniques and/or machine learning (ML) model 362 to help detect network connectivity issues by evaluating network connectivity events with respect to AP-side data 316 and client-side data 317. Additionally, or alternatively, network connectivity engine 352 utilizes artificial intelligence-based techniques and/or machine learning models 362 to identify a root cause of the connectivity issue.

VNA/AI engine 350 may, in some examples, construct, train, apply, and retrain supervised and/or unsupervised ML model 362 to event data (e.g., network data 316) to determine whether the collected network event data represents anomalous behavior that needs to be further analyzed by VNA/AI engine 350 to facilitate identification and resolution of faults. VNA/AI engine 350 may then apply the ML model 362 to data streams and/or logs of newly collected data of various network event types (e.g., statistics and data extracted from messages, counters, or the like) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model 362 to newly collected data indicates that mitigation is required, VNA/AI engine 350 may identify a root cause of the anomalous system behavior and, if possible, trigger automated or semi-automated corrective action. In this way, VNA/AI engine 350 may construct and apply a ML model 362 based on a particular complex network to determine whether to perform further, resource-intensive analysis on incoming streams of path data collected (e.g., in real-time) from network devices within the complex network system.

In addition, VNA/AI engine 350 may automatically invoke one or more remedial actions intended to address the identified root cause(s) of a connectivity issue. Examples of remedial actions that may be automatically invoked by VNA/AI engine 350 may include, but are not limited to, invoking RRM 360 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. In some examples, the remedial actions may also include restarting a server. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

ML models 362 may include one or more different supervised ML models that are applied to AP-side data 316 and client-side data 317. Each of the supervised ML models may be configured with one or more parameters (e.g., model labels) to detect network connectivity issues. For example, an ML model for a particular network attribute may include model labels such as a count of clients threshold, a count of failure events threshold, duration threshold, and/or a roaming threshold. As described further below, network connectivity engine 352 may compare network event data from AP-side data 316 associated with one client device and compare network event data from client-side data 317 for the same client device. By applying ML models 362 to the AP-side data 316 and client-side data 317, network connectivity engine 352 may detect a network connectivity issue or other anomalous network behavior and/or identify the root cause of the anomalous network behavior.

Conversational assistant engine 336 may be configured to process user inputs, such as text strings or selections of user interface elements, and generate responses. In some examples, conversational assistant engine 336 may include one or more natural language processors configured to process the user inputs. Conversational assistant engine 336 may be configured to generate a conversational assistant for display on network administrator's computing device 111 for conducting a chat conversation that simulates a way a human would behave as a conversation partner, which may help to simplify and/or improve a satisfaction of an administrator monitoring and controlling a network.

In accordance with one or more techniques of the disclosure, conversational assistant engine 336 may receive a first user input. For instance, conversational assistant engine 336 may generate a conversational assistant that is configured to receive a string indicating a device identifier (e.g., "troubleshoot AP1"). In some instances, the conversational assistant may receive a string indicating a user identifier (e.g., "troubleshoot user1"). The conversational assistant may receive a string indicating a geographical identifier (e.g., "troubleshoot site1").

Conversational assistant engine 336 may determine a particular network device of a plurality of network devices based on a first user input in a conversational assistant. For example, conversational assistant engine 336 may determine an AP device based on a first user input (e.g., a device identifier for the AP device) in conversational assistant engine 336. Network connectivity engine 352 may identify a set of actionable insights for the particular network device based on network data received from the plurality of network devices. Each actionable insight of the set of actionable insights may identify one or more steps for troubleshooting the particular network device. For example, network connectivity engine 352 may identify a set of actionable insights (e.g., correcting a slow association due to a previous authentication being no longer valid or correcting a limited capacity on the AP device) for the AP device based on network data received from the AP devices. For instance, network connectivity engine 352 may apply a root cause engine to the network data received from the AP devices.

Network connectivity engine 352 may determine a set of views of a dashboard based at least on the set of actionable insights. Each view of the set of views may display a portion of the network data received from the plurality of network devices. For example, network connectivity engine 352 may determine, for each actionable insight of the set of actionable insights, supporting evidence information for each view. The supporting evidence information may include one or more of a failure timeline for the particular network device, a client insight, or a scope of impact. As an example, network connectivity engine 352 may determine a first view for a failure timeline for AP device 142A-1, determine a second view for a client insight for a user associated with AP device 142A-1, and determine a third view for a scope of impact for AP device 142A-1.

Network connectivity engine 352 may select a view of the set of views of the dashboard based on a second user input in the conversational assistant. For example, network connectivity engine 352 may cause user equipment 148A-1 to display a user interface to indicating each one of the set of views and the user interface determines a user interaction (e.g., using a mouse, using a touch sensitive display, etc.) indicating a selection of one of the views of the set of views.

Network connectivity engine 352 may cause user interface 310 to display a dashboard with the selected view using the network data received from the plurality of network devices. For example, network connectivity engine 352 may cause network administrator's computing device 111 to display a user interface with the dashboard indicating the selected view. The selected view may include a portion of the network data received from the plurality of network devices. For example, the selected view may display supporting evidence information for AP device 142A-1.

Figure 4:
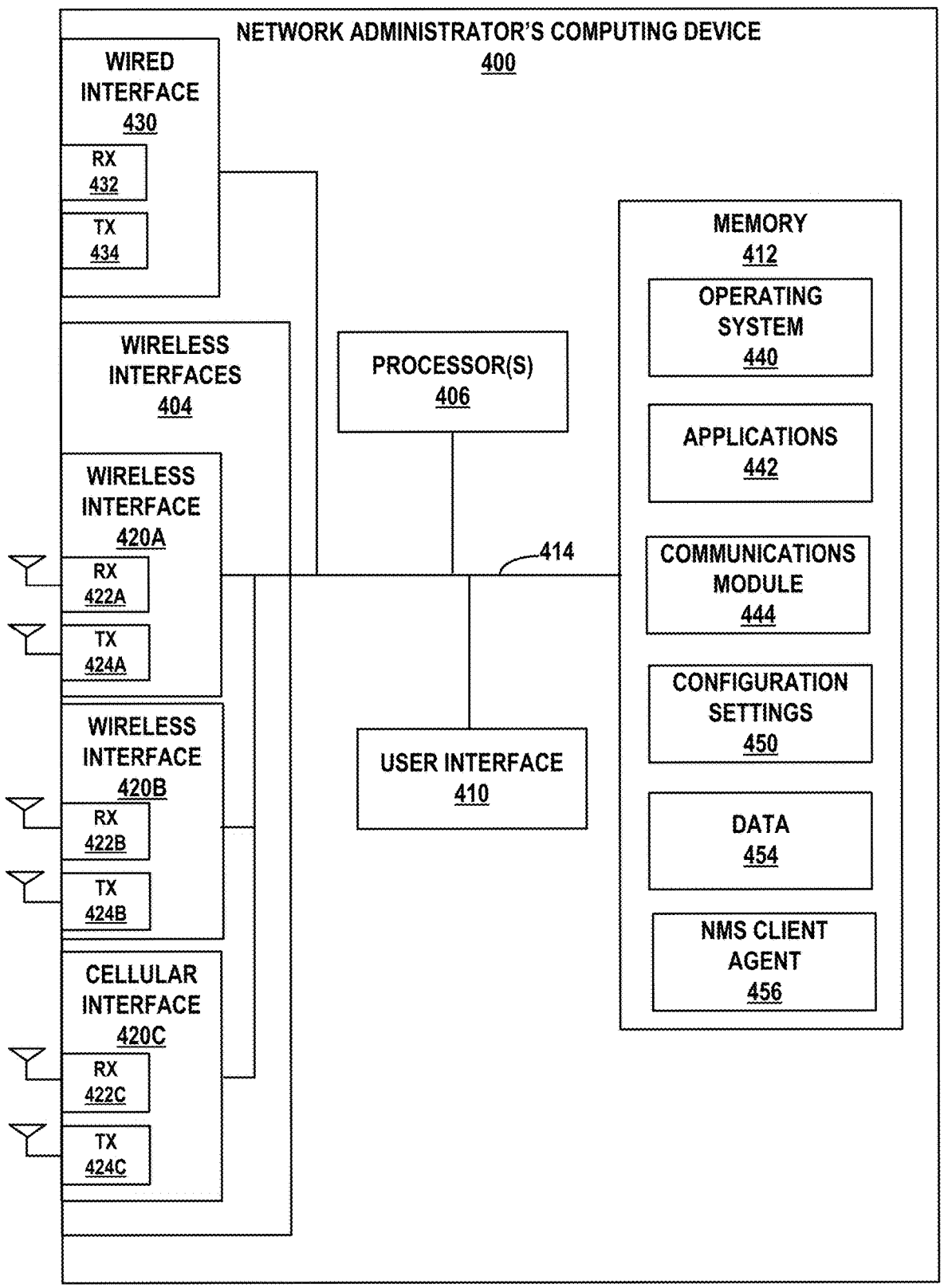
FIG. 4 is a block diagram of example network administrator's computing device, in accordance with one or more techniques of the disclosure.

FIG. 4 shows an example network administrator's computing device 400. Example Network administrator's computing device 400 shown in FIG. 4 may be used to implement network administrator's computing device 111 as shown and described herein with respect to FIG. 1. Network administrator's computing device 400 may include any type of wireless client device, and the disclosure is not limited in this respect. For example, Network administrator's computing device 400 may include a mobile device such as a smart phone, tablet or laptop computer, a personal digital assistant (PDA), a wireless terminal, a smart watch, a smart ring or any other type of mobile or wearable device. Network administrator's computing device 400 may also include any type of IoT client device such as a printer, a security sensor or device, an environmental sensor, or any other connected device configured to communicate over one or more wireless networks.

Network data may be stored in UE memory 412 as network data 454 and transmitted to NMS 130/300 via one or more AP devices 142 in the wireless network. In some examples, NMS 130/300 receives data directly from UEs 148 not via AP devices 142. For example, NMS 130/300 receives network data from UEs 148 in networks 106A-106N of FIG. 1. In some examples, NMS 130/300 receives relevant network data from UEs 148 on a continuous basis (e.g., every 2 seconds, 30 seconds, 40 seconds, or other appropriate time period), and NMS may determine the connection status of each UE to the network. The network data 454 may include, for example, a log of one or more UE associated events or states (e.g., failure event, successful event, neutral event, etc.), and any other data or event relevant for determination of the connection status of the UE.

Network administrator's computing device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple Network administrator's computing device 400 to network(s) 134 of FIG. 1. First, second and third wireless interfaces 420A, 420B, and 420C include receivers 422A, 422B, and 422C, respectively, each including a receive antenna via which network administrator's computing device 400 may receive wireless signals from wireless communications devices, such as AP devices 142 of FIG. 1, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which network administrator's computing device 400 may transmit wireless signals to wireless communications devices, such as AP devices 142 of FIG. 1, AP device 200 of FIG. 2, other UEs 148 and/or other devices configured for wireless communication. In some examples, first wireless interface 420A may include a WiFi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which network administrator's computing device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of network administrator's computing device 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to network administrator's computing device 400. As described above, network data 454 may include any network data, events, and/or states that may be related to determination of one or more roaming quality assessments. The network data may include event data such as a log of normal events and error events according to a logging level based on instructions from the network management system (e.g., NMS 130/300). Data storage for network data 454 may store any data used and/or generated by network administrator's computing device 400, such as network data used to determine connection status of the UE to the network, that is collected by network administrator's computing device 400 and transmitted to any of AP devices 148 in a wireless network 106 for further transmission to NMS 130.

Communications module 444 includes program code that, when executed by processor(s) 406, enables network administrator's computing device 400 to communicate using any of wired interface(s) 430, wireless interfaces 420A-420B and/or cellular interface 420C. Configuration settings 450 include any device settings for network administrator's computing device 400 settings for each of wireless interface (s) 420A-4208 and/or cellular interface 420C.

NMS client agent 456 is a software agent of NMS 130 and/or NMS 300 that is installed on network administrator's computing device 400. In some examples, NMS client agent 456 can be implemented as a software application running on network administrator's computing device 400. For example, NMS client agent 456 collects information including detailed client-device properties from network administrator's computing device 400, including insight into network administrator's computing device 400 roaming behaviors. The information provides insight into client roaming behavior because roaming is a client device decision. In some examples, NMS client agent 456 may display the client-device properties on network administrator's computing device 400. NMS client agent 456 sends the client device properties to NMS 130/300 either directly or via an AP device with which network administrator's computing device 400 is associated. NMS client agent 456 can be integrated into a custom application, e.g., via mobile device management (MDM). NMS client agent 456 may be configured to recognize device connection types (e.g., cellular or WiFi), and determine the corresponding signal strength (e.g., received signal strength indicator or RSSI) of the received wireless signal. For example, NMS client agent 456 recognizes access point connections and their corresponding wireless signal strengths as received by network administrator's computing device 400. NMS client agent 456 can store information specifying the APs recognized by network administrator's computing device 400 as well as their corresponding wireless signal strengths. NMS client agent 456 or other element of network administrator's computing device 400 also collects information about which APs the network administrator's computing device 400 is or was associated with and/or which APs network administrator's computing device 400 is or was not associated with. NMS client agent 456 of network administrator's computing device 400 sends this information to NMS 130/300 via its associated AP (that is, the AP with which network administrator's computing device 400 is wirelessly communicating with). In this manner, network administrator's computing device 400 sends information about not only the AP that network administrator's computing device 400 is associated with, but also information about other APs that network administrator's computing device 400 recognized and did not connect with, and the received signal strengths of their respective wireless signals. The AP in turn forwards this information to the NMS, including the information about other APs the network administrator's computing device 400 recognized besides itself. This additional level of granularity enables NMS 130/300, and ultimately network administrators, to better determine the WiFi experience directly from the client device's perspective.

In accordance with one or more techniques of the disclosure, NMS client agent 456 may cause user interface 410 to display a conversational assistant. For example, NMS client agent 456 may cause user interface 410 to display a window for receiving text strings from a network administrator. NMS client agent 456 may determine a first user input (e.g., a sequence of keys selected on a physical keyboard or virtual keyboard, a voice-to-text process, a selection of an item using a mouse or touch sensitive screen, or another user input) received by user interface 410. For instance, NMS client agent 456 may generate the conversational assistant to receive a string indicating a device identifier (e.g., "troubleshoot AP1"). In some instances, NMS client agent 456 may generate the conversational assistant to receive a string indicating a user identifier (e.g., "troubleshoot user1"). NMS client agent 456 may generate the conversational assistant to receive a string indicating a geographical identifier (e.g., "troubleshoot site1").

NMS client agent 456 may determine a second user input (e.g., a sequence of keys selected on a physical keyboard or virtual keyboard, a voice-to-text process, a selection of an item using a mouse or touch sensitive screen, or another user input) received by user interface 410. For instance. NMS client agent 456 may cause user interface 410 to display the conversational assistant with an indication of each one of the set of views. For instance, NMS client agent 456 may cause user interface 410 to display the conversational assistant an indication of a failure timeline, an indication of a client insight, or an indication of a scope of impact. In this example, NMS client agent 456 may generate the conversational assistant to receive a selection (e.g., a selection using a mouse and/or a touch screen) of one of the indications displayed by user interface 410 from the network administrator.

NMS client agent 456 may cause user interface 410 to display a dashboard with the selected view using the network data received from the plurality of network devices.

For example, NMS client agent 456 may cause user interface 410 to display a dashboard indicating the selected view. For instance, NMS client agent 456 may cause user interface 410 to display a dashboard indicating a failure timeline, an indication of a client insight, or an indication of a scope of impact.

Figure 5:
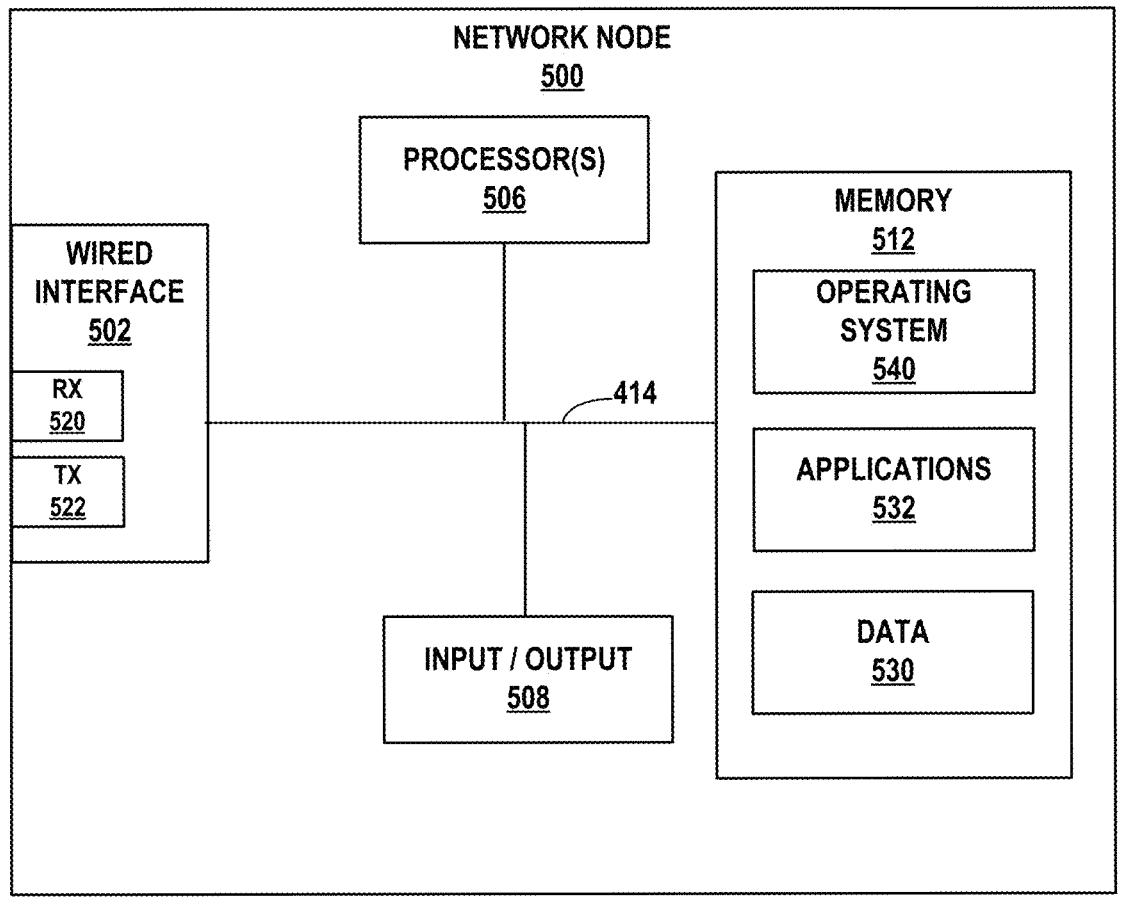
FIG. 5 is a block diagram of an example network node, such as a router or switch, in accordance with one or more techniques of the disclosure.

FIG. 5 is a block diagram illustrating an example network node 500 configured according to the techniques described herein. Network node 500 may implement any of UEs 148, a device, or a server attached to the network 134 of FIG. 1, e.g., router, switch, AAA server 110, DHCP server 116, DNS server 122, VNA 133, web server 128A-128X, etc., or a network device such as, e.g., routers, switches or the like.

Network node 500 may include a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, network nodes may have multiple communication interfaces. Communications interface 502 includes a receiver 520 via which the network node 500 can receive data and information (e.g., including operation related information such as registration request, AAA services, DHCP requests, Simple Notification Service (SNS) look-ups, and Web page requests). Communications interface 502 includes a transmitter 522, via which the network node 500 can send data and information (e.g., including configuration information, authentication information, web page data, etc.).

Memory 512 may store executable software applications 532, operating system 540 and data/information 530. Data 530 includes system log and/or error log that stores network data for node 500 and/or other devices, such as wireless access points, based on a logging level according to instructions from the network management system. Network node 500 may, in some examples, forward the network data to a network management system (e.g., NMS 130 of FIG. 1) for analysis as described herein.

Figure 6:
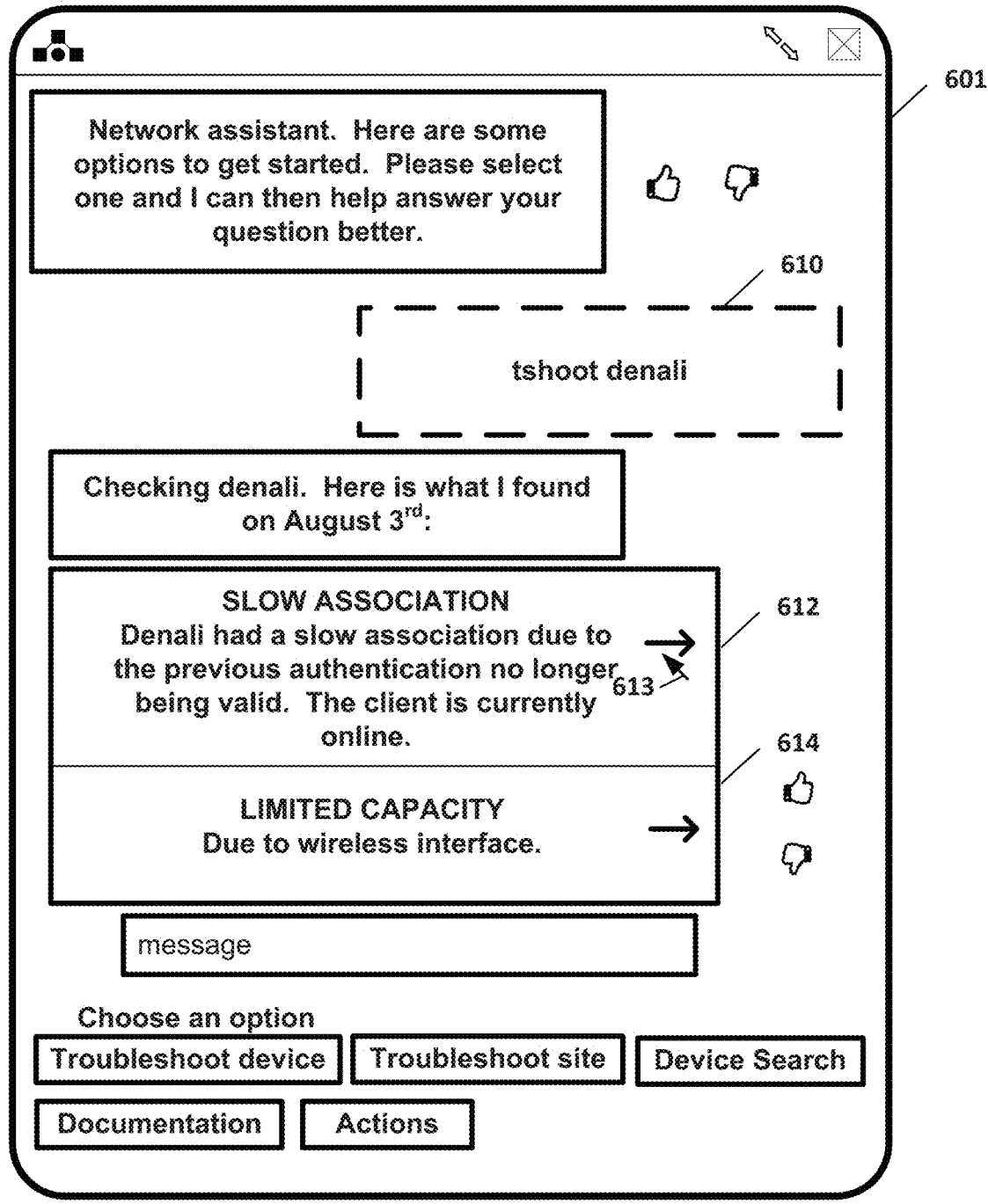
FIG. 6 illustrates an example conversational assistant configured to display an indication of each actionable insight, in accordance with one or more techniques of the disclosure.

FIG. 6 illustrates an example conversational assistant 601 configured to display an indication of each actionable insight, in accordance with one or more techniques of the disclosure. FIG. 6 is discussed with respect to FIGS. 1-5 for example purposes only. Network administrator's computing device 400 may be used to implement network administrator's computing device 111. However, other devices connected to network 134 may be used to display conversational assistant 601.

In this example, NMS client agent 456 may cause user interface 410 to display conversational assistant 601. For example, conversational assistant 601 may include a chat window configured to receive text strings. NMS client agent 456 may determine a first user input (e.g., a sequence of keys selected on a physical keyboard or virtual keyboard, a voice-to-text process, a selection of an item using a mouse or touch sensitive screen, or another user input) received by user interface 410. For instance, conversational assistant 601 may receive a string indicating a device identifier (e.g., "troubleshoot AP1"). In some instances, conversational assistant 601 may receive a string indicating a user identifier (e.g., "troubleshoot user1"). Conversational assistant 601 may receive a string indicating a geographical identifier (e.g., "troubleshoot site1").

In the example of FIG. 6, NMS client agent 456 may determine a particular network device (e.g., "denali") of a plurality of network devices based on a first user input 610 (e.g., "tshoot denali") in conversational assistant 601. NMS client agent 456 may identify a set of actionable insights for the particular network device based on the network data received from the plurality of network devices (e.g., "Slow Association" and "Limited Capacity"). NMS client agent 456 may cause conversational assistant 601 to display an indication of each actionable insight of the set of actionable insights for the particular device. For example, NMS client agent 456 may cause conversational assistant 601 to display a first indication 612 for a slow association for the network device "denali" and a second indication 614 for a limited capacity for the network device "denali."

NMS client agent 456 may determine a selected actionable insight from the set of actionable insights for the particular network device based on a user input 613 (e.g., a mouse click or user interaction with a touch screen) in conversational assistant 601. NMS client agent 456 may determine of a set of views is further based on the selected actionable insight. For example, NMS client agent 456 may determine the set of views to display supporting information (e.g., a failure timeline for the particular network device, a client insight, or a scope of impact) for a slow association.

Figure 7:
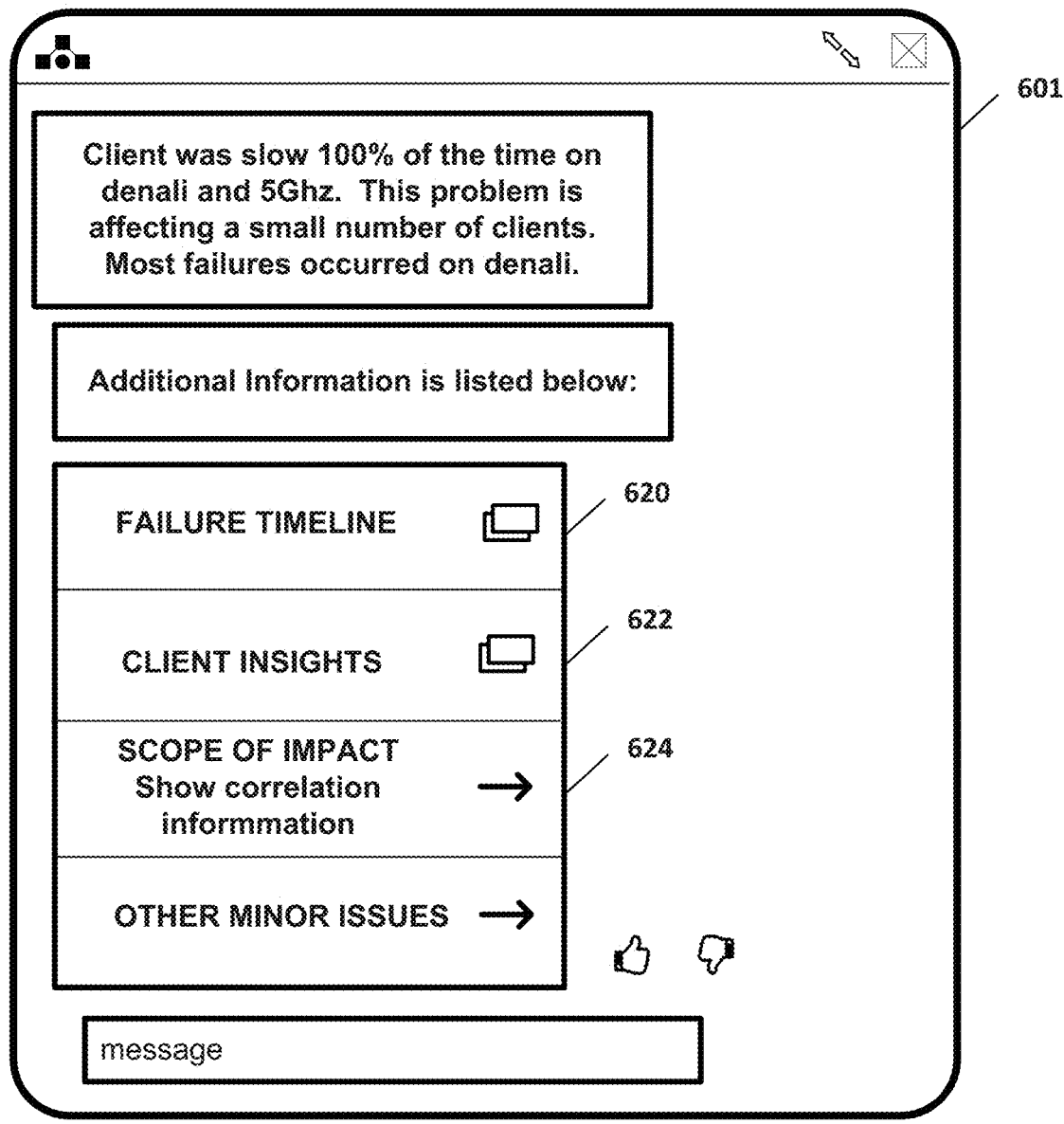
FIG. 7 illustrates an example conversational assistant configured to display an indication of each view of the a set of views, in accordance with one or more techniques of the disclosure.

FIG. 7 illustrates an example conversational assistant configured to display an indication of each view of the set of views, in accordance with one or more techniques of the disclosure. FIG. 7 is discussed with respect to FIGS. 1-6 for example purposes only. NMS client agent 456 may cause conversational assistant 601 to display an indication of each view of the set of views. For example, NMS client agent 456 may cause conversational assistant 601 to display a first indication 620 for a failure timeline for the network device "denali," a second indication 622 for client insights for the network device "denali," and a third indication 624 for a scope of impact for the network device "denali."

Figure 8:
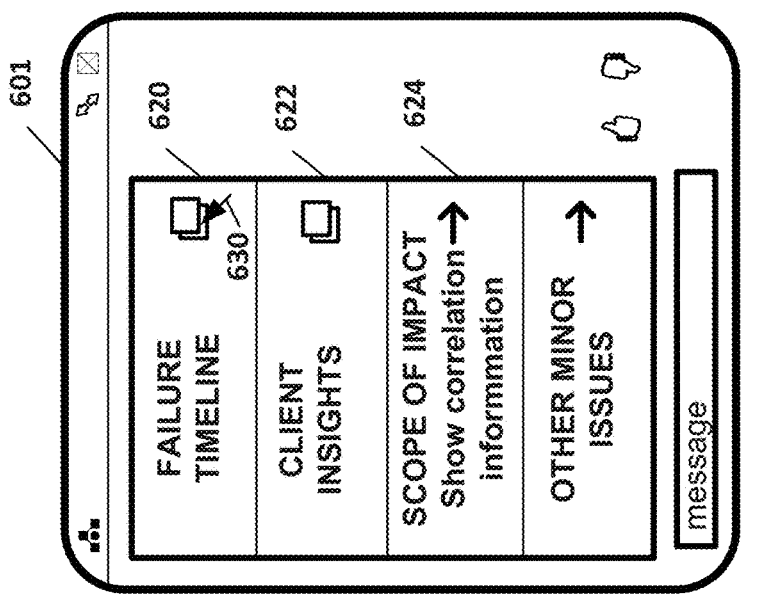
FIG. 8 illustrates an example conversational assistant configured to cause a dashboard to display a selected view, in accordance with one or more techniques of the disclosure.
Figure 8:
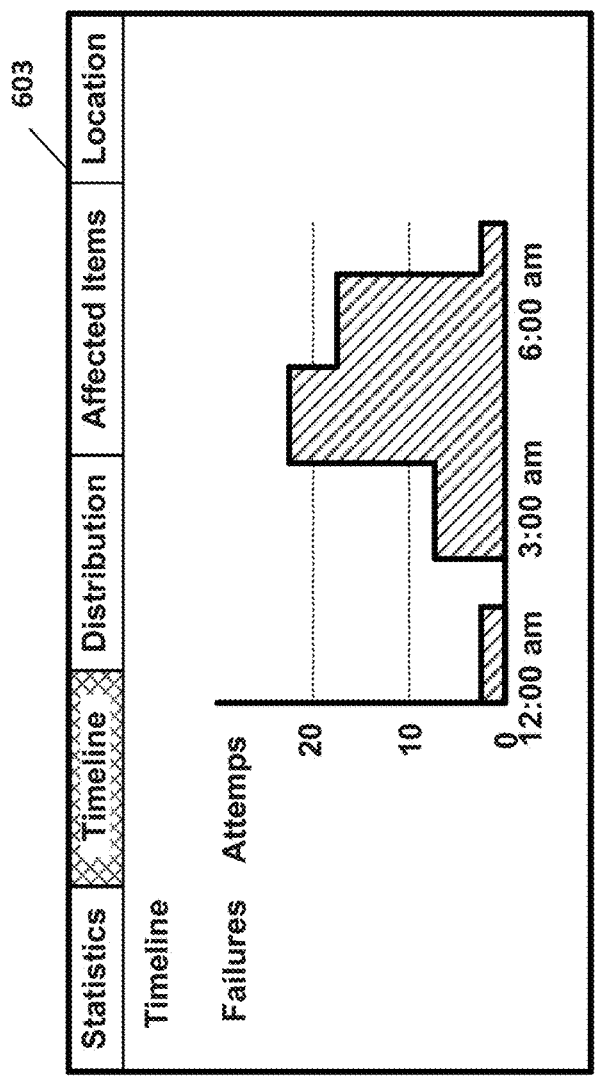

FIG. 8 illustrates an example conversational assistant configured to cause a dashboard to display a selected view, in accordance with one or more techniques of the disclosure. FIG. 8 is discussed with respect to FIGS. 1-7 for example purposes only. NMS client agent 456 may determine a user input 630 (e.g., a selection of an item using a mouse or touch sensitive screen). For instance, NMS client agent 456 may determine that user input 630 selects first indication 620. In response to the determination that user input 630 selects first indication 620, NMS client agent 456 may cause dashboard 603 to display the selected view using the network data received from the plurality of network devices. For example, NMS client agent 456 may cause dashboard 603 to display an indication of the selected view. For instance, NMS client agent 456 may cause dashboard 603 to display an indication of a failure timeline.

NMS client agent 456 may cause network administrator's computing device 111 to display both conversational assistant 601 and dashboard 603. For example, NMS client agent 456 may cause network administrator's computing device 111 to display conversational assistant 601 and dashboard 603 on a single screen or a set of screens. In some examples, NMS client agent 456 may cause network administrator's computing device 111 to display conversational assistant 601 and dashboard 603 on a single window, that is displayed on one or more screens. NMS client agent 456 may cause network administrator's computing device 111 to display conversational assistant 601 and dashboard 603 on multiple windows for display by network administrator's computing device 111.

Figure 9:
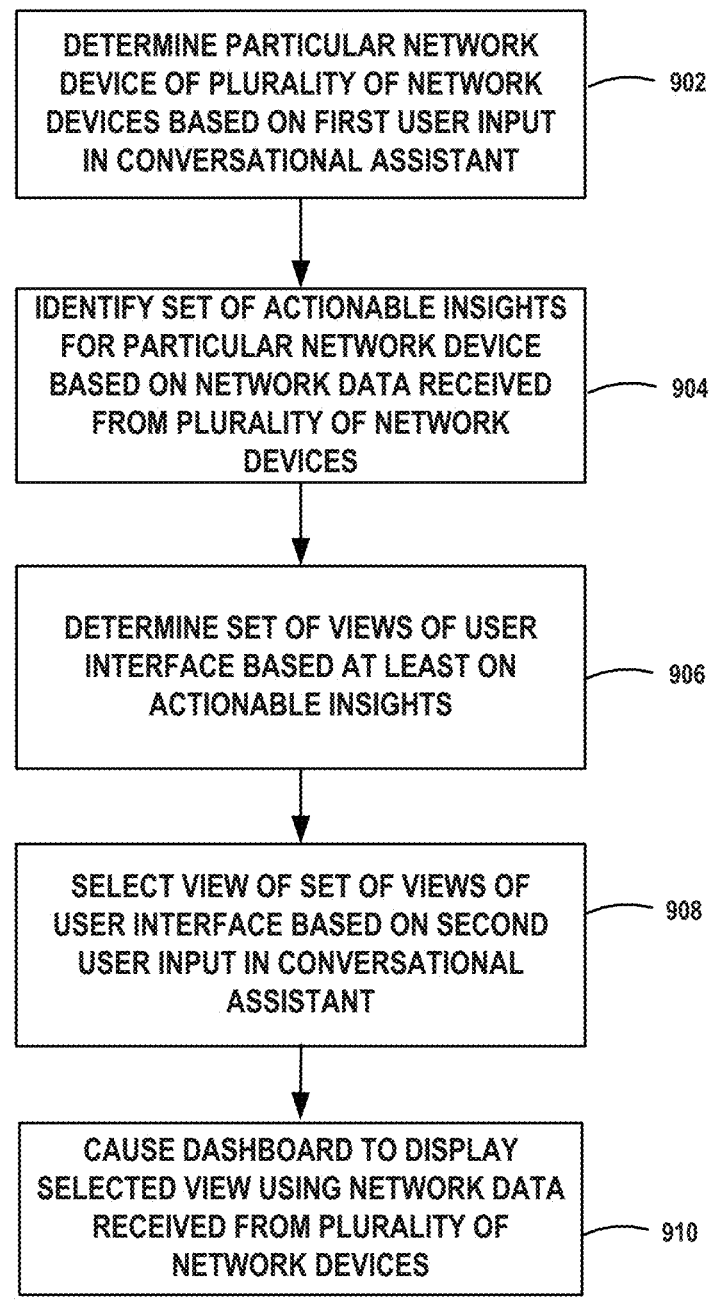
FIG. 9 is a flowchart of an example process by which a network management system directs an administrator to actionable insights, in accordance with one or more techniques of the disclosure.

FIG. 9 is a flowchart of an example process by which a network management system directs an administrator to actionable insights, in accordance with one or more techniques of the disclosure. FIG. 9 is discussed with respect to FIGS. 1-8 for example purposes only.

Conversational assistant engine 136 may receive a first user input. For instance, conversational assistant engine 136 may receive a user input 610 that includes a string indicating a device identifier (e.g., "troubleshoot AP1"). In some instances, conversational assistant engine 136 may receive a string indicating a user identifier (e.g., "troubleshoot user1"). Conversational assistant engine 136 may receive a string indicating a geographical identifier (e.g., "troubleshoot site1").

Conversational assistant engine 136 may determine a particular network device of a plurality of network devices based on a first user input in a conversational assistant (902). For example, conversational assistant engine 136 may determine a AP device 142A-1 of AP devices 142 based on a first user input (e.g., a device identifier for AP device 142A-1) in conversational assistant engine 136. Network connectivity engine 135 may identify a set of actionable insights for the particular network device based on network data received from the plurality of network devices (904). Each actionable insight of the set of actionable insights identifies one or more steps for troubleshooting the particular network device. For example, network connectivity engine 135 may identify a set of actionable insights (e.g., correcting a slow association due to a previous authentication being no longer valid or correcting a limited capacity on AP device 142A-A) for AP device 142A-1 based on network data received from AP devices 142. For instance, network connectivity engine 135 may apply a root cause engine to the network data received from AP devices 142 to identify a root cause of anomalous behavior with respect to AP 142A-1 and/or to identify one or more actionable insights to address or mitigate the root cause of the anomalous behavior identified with respect to AP 142A-1.

Network connectivity engine 135 may determine a set of views of a dashboard based at least on the set of actionable insights (906). Each view of the set of views may display a portion of the network data received from the plurality of network devices. For example, network connectivity engine 135 may determine, for each actionable insight of the set of actionable insights, supporting evidence information for each view. The supporting evidence information may include one or more of a failure timeline for the particular network device, a client insight, or a scope of impact. As an example, network connectivity engine 135 may determine a first view for a failure timeline for AP device 142A-1, determine a second view for a client insight for a user associated with AP device 142A-1, and determine a third view for a scope of impact for AP device 142A-1.

Network connectivity engine 135 may select a view of the set of views of the dashboard based on a second user input in the conversational assistant engine 136 (908). For example, network connectivity engine 135 may cause user equipment 148A-1 to display a user interface to indicating each one of the set of views and the user interface determines a user interaction 630 indicating a selection of one of the views (e.g., a failure timeline) of the set of views.

Network connectivity engine 135 may cause user 603 interface to display the selected view using the network data received from the plurality of network devices (910). For example, network connectivity engine 135 may cause user equipment 148A-1 to display a dashboard 603 to indicating the selected view. The selected view may include a portion of the network data received from the plurality of network devices. For example, the selected view may display supporting evidence information for AP device 142A-1.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

The specific order or hierarchy of steps in the processes disclosed is an example of example approaches. Based upon design preferences, the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine. e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.1 lay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License—Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), WiFi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a WiFi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

Definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. The functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. In general, the systems, methods and techniques disclosed herein will work equally well for other types of communications environments, networks and/or protocols.

For purposes of explanation, numerous details are set forth to provide a thorough understanding of the present techniques. However, the present disclosure may be practiced in a variety of ways beyond the specific details set forth herein. Furthermore, while the examples illustrated herein show various components of the system collocated, the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, the components of the system can be combined into one or more devices, or split between devices, such as a transceiver, an access point, a station, a Domain Master, a network operation or management device, a node or collocated on a particular node of a distributed network, such as a communications network. For reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture. Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core®15-3570K 22 nm Ivy Bridge, the AMD® FXT™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing the ability to diagnose and remedy network issues. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A network management system (NMS) configured to manage a plurality of network devices configured to provide networking services at a site, the NMS comprising
a memory configured to store network data received from the plurality of network devices; and
one or more processors coupled to the memory and configured to:
determine a particular network device of the plurality of network devices based on a first user input in a conversational assistant;
identify, based on the network data received from the plurality of network devices, a set of one or more anomalous network operations with respect to the particular network device;
identify, based on the network data received from the plurality of network devices, a set of actionable insights for the set of one or more anomalous network operations identified with respect to the particular network device, wherein each actionable insight of the set of actionable insights identifies one or more steps for the set of one or more anomalous network operations identified with respect to the particular network device;
determine a set of views of a dashboard, wherein, to determine the set of views of the dashboard, the one or more processors are configured to determine, based on a selection of an actionable insight of the set of actionable insights for the set of one or more anomalous network operations identified with respect to the particular network device and further based on the particular network device, supporting evidence information for a view of the set of views and wherein each view of the set of views displays a portion of the network data received from the plurality of network devices, the supporting evidence information comprising one or more of a failure timeline for the particular network device, a client insight for a user associated with the particular network device, or a scope of impact for the particular network device;
cause the dashboard to display an indication of the supporting evidence information;
select a view of the set of views of the dashboard based on a second user input in the conversational assistant indicating a selection of the supporting evidence information displayed in the dashboard;
generate data representative of the selected view using the network data received from the plurality of network devices; and
cause the dashboard to display the selected view using the generated data.

2. The NMS of claim 1, wherein, to determine the particular network device, the one or more processors are configured to apply a natural language processor to the first user input.

3. The NMS of claim 1, wherein, to determine the particular network device, the one or more processors are configured to:
determine a device identifier based on the first user input; and
determine that the particular network device is assigned the device identifier.

4. The NMS of claim 1, wherein, to determine the particular network device, the one or more processors are configured to:
determine a user identifier based on the first user input; and
determine that the particular network device is associated with the user identifier.

5. The NMS of claim 1, wherein, to determine the particular network device, the one or more processors are configured to:
determine a geographical identifier based on the first user input; and
determine that the particular network device is associated with the geographical identifier.

6. The NMS of claim 1, wherein, to identify the set of actionable insights for the particular network device, the one or more processors are configured to apply a root cause engine to the network data received from the plurality of network devices.

7. The NMS of claim 1, wherein the one or more processors are configured to:
cause the conversational assistant to display an indication of each actionable insight of the set of actionable insights for the particular network device; and
determine the selected actionable insight from the set of actionable insights for the particular network device based on a third user input in the conversational assistant.

8. The NMS of claim 1, wherein the set of actionable insights comprises one or more of correcting a slow association due to a previous authentication being no longer valid or correcting a limited capacity on the particular network device.

9. The NMS of claim 1, wherein the supporting evidence information comprises the failure timeline for the particular network device.

10. The NMS of claim 1, wherein the particular network device comprises an access point.

11. A method comprising
determining, by processing circuitry, a particular network device of a plurality of network devices based on a first user input in a conversational assistant;
identifying, by the processing circuitry and based on network data received from the plurality of network devices, a set of one or more anomalous network operations with respect to the particular network device;
identifying, by the processing circuitry and based on the network data received from the plurality of network devices, a set of actionable insights for the set of one or more anomalous network operations identified with respect to the particular network device, wherein each actionable insight of the set of actionable insights identifies one or more steps for the set of one or more anomalous network operations identified with respect to the particular network device;
determining, by the processing circuitry, a set of views of a dashboard, wherein determining the set of views of the dashboard comprises determining, based on a selection of an actionable insight of the set of actionable insights for the set of one or more anomalous network operations identified with respect to the particular network device and further based on the particular network device, supporting evidence information for a view of the set of views and wherein each view of the set of views displays a portion of the network data received from the plurality of network devices, the supporting evidence information comprising one or more of a failure timeline for the particular network device, a client insight for a user associated with the particular network device, or a scope of impact for the particular network device;

causing, by the processing circuitry, the dashboard to display an indication of the supporting evidence information;

selecting, by the processing circuitry, a view of the set of views of the dashboard based on a second user input in the conversational assistant indicating a selection of the supporting evidence information displayed in the dashboard;

generating, by the processing circuitry, data representative of the selected view using the network data received from the plurality of network devices; and causing, by the processing circuitry, the dashboard to display the generated data.

12. The method of claim 11, wherein determining the particular network device comprises applying a natural language processor to the first user input.

13. The method of claim 11, wherein determining the particular network device comprises:
  determining a device identifier based on the first user input; and
  determining that the particular network device is assigned the device identifier.

14. The method of claim 11, wherein determining the particular network device comprises:
  determining a user identifier based on the first user input; and
  determining that the particular network device is associated with the user identifier.

15. The method of claim 11, wherein determining the particular network device comprises:
  determining a geographical identifier based on the first user input; and
  determining that the particular network device is associated with the geographical identifier.

16. The method of claim 11, wherein identifying the set of actionable insights for the particular network device comprises applying a root cause engine to the network data received from the plurality of network devices.

17. Non-transitory computer-readable storage media comprising instructions that, when executed, configure processing circuitry to:
  determine a particular network device of a plurality of network devices based on a first user input in a conversational assistant;
  identify, based on network data received from the plurality of network devices, a set of one or more anomalous network operations with respect to the particular network device;
  identify, based on the network data received from the plurality of network devices, a set of actionable insights for the set of one or more anomalous network operations identified with respect to the particular network device, wherein each actionable insight of the set of actionable insights identifies one or more steps for the set of one or more anomalous network operations identified with respect to the particular network device;
  determine a set of views of a dashboard, wherein, to determine the set of views of the dashboard, the instructions cause the processing circuitry to determine, based on a selection of an actionable insight of the set of actionable insights for the set of one or more anomalous network operations identified with respect to the particular network device and further based on the particular network device, supporting evidence information for a view of the set of views and wherein each view of the set of views displays a portion of the network data received from the plurality of network devices, the supporting evidence information comprising one or more of a failure timeline for the particular network device, a client insight for a user associated with the particular network device, or a scope of impact for the particular network device;
  cause the dashboard to display an indication of the supporting evidence information;
  select a view of the set of views of the dashboard based on a second user input in the conversational assistant indicating a selection of the supporting evidence information displayed in the dashboard;
  generate data representative of the selected view using the network data received from the plurality of network devices; and
  cause the dashboard to display the selected view using the generated data.

* * * * *